Patented June 27, 1933

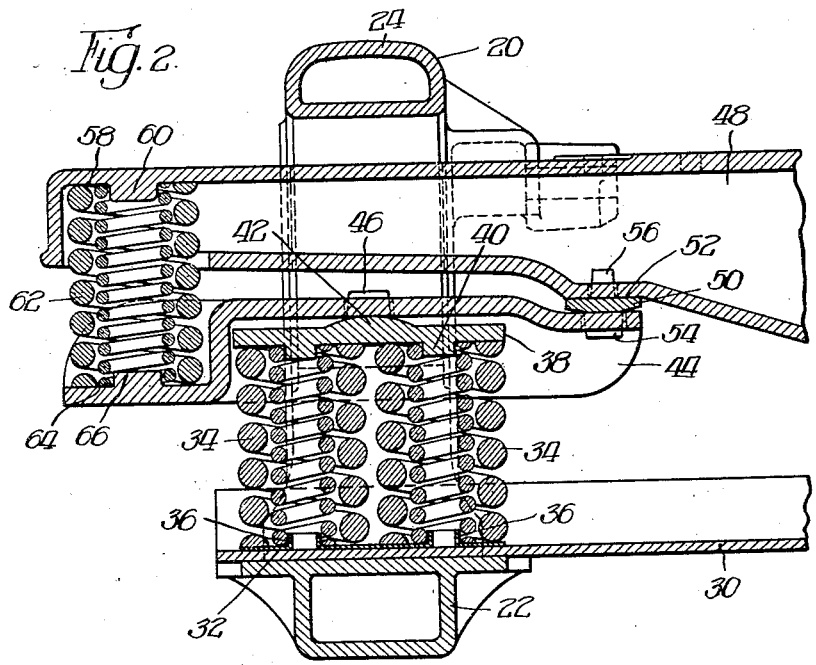

1,916,146

UNITED STATES PATENT OFFICE

WILLIAM C. HEDGCOCK, OF WILMETTE, ILLINOIS, ASSIGNOR TO AMERICAN STEEL FOUNDRIES, OF CHICAGO, ILLINOIS, A CORPORATION OF NEW JERSEY

TRUCK

Application filed October 2, 1931. Serial No. 566,489.

This invention pertains to car trucks.

The usual present freight car truck has a spring suspension of coil springs. These coil springs are arranged so that they have relatively free motion and they are very deficient in good riding qualities, inasmuch as they have a natural period of oscillation which is reached at some operating speed of the car. This natural period of oscillation, when reached, results in synchronous motion which is transmitted violently to the truck bolster, the car body and lading, often resulting in the damage or even the destruction of the lading.

It is an object of this invention to provide a car truck having an improved spring suspension affording easy riding qualities, yet at the same time using springs of a single type.

Another object of the invention is to provide a coil spring suspension for a car truck wherein a construction is provided to eliminate or dampen synchronous motion.

A further object of the invention is to provide a car truck wherein a spring suspension is arranged so that there will be softer spring action under light loads, yet at the same time stiff spring action and ample capacity will be provided under heavy loads.

With these and various other objects in view, the invention may consist of certain novel features of construction and operation as will be more fully described and particularly pointed out in the specification, drawing and claims appended hereto.

In the drawing, which illustrates an embodiment of the device and wherein like reference characters are used to designate like parts—

Figure 1 is a fragmentary side elevation of a truck construction embodying the invention;

Figure 2 is a transverse fragmentary sectional elevation taken substantially in the plane as indicated by the line 2—2 of Figure 1;

Figure 3 is a transverse fragmentary sectional elevation showing a modified form of spring suspension.

In the truck constructions illustrated, the side frame 20 includes the tension member 22 and the compression member 24 integrally connected by means of the spaced column guides 26 forming a bolster opening or window 28. It will of course be understood that the tension and compression members converge adjacent their ends and are provided with any preferred form of journal box cooperating with the journal ends of any preferred form of wheel and axle assemblies. The spaced side frames are connected by means of the spring plank 30 extending into the bolster opening and provided with the spring seats 32 on which the nests of coil springs 34 are disposed in position by means of the dowels 36.

The coil springs are provided with the spring cap 38 positioned by means of the depending dowels 40, the spring cap being provided with the center arcuate fulcrum point 42 on which the non-resilient equalizing member 44 is mounted. The spring cap is preferably formed with the positioning dowel 46 received in a suitable aperture formed in the equalizing member. The equalizing member serves as a lever, the inner end of which acts as a direct support for the bolster 48. The inner end of the equalizing member is seated on the seat member 50 disposed on the seat portion 52 of the bolster, a depending dowel 54 being received in an aperture in the equalizing member, and an upstanding positioning dowel 56 being received in an aperture formed in the seat portion 52 whereby the member is positioned between the bolster and equalizing member.

The bolster 48 extends through the bolster opening and the upper chord thereof is provided with the coil spring seats 58 having the depending positioning dowels 60. The coil spring assemblies 62 are seated on the seats 58 and on the seats 64 provided at the outer end of the equalizing member, the positioning dowel cooperating with each of said coil spring assemblies. Thus the equalizing member resiliently supports the bolster adjacent the outer end thereof. The coil springs 62 are preferably of different characteristics than the coil spring assemblies 34, and in Figure 3 the coil spring assembly 68 is shown formed of a bar of tapering diameter. Any type of coil spring may be provided such as shown in application Serial No. 552,153, filed July 21, 1931. Each set of coil springs 34, as well as the coil spring 62, may be of varying characteristics and may or may not be seated on resilient pads, as desired.

The coil springs seated on the side frame and supporting the equalizing member preferably have a different natural period of oscillation from the coil springs positioned between the end of the equalizing member and the bolster, and may have different characteristics from each other. Therefore, the different kinds of coil springs are free to act independently and do not have a common period of oscillation. A tendency for one kind of coil spring to develop synchronous vibration is dampened or nullified by the other group of coil springs which does not naturally oscillate in the same period. Therefore synchronous vibration of the entire spring suspension is avoided, resulting in a resilient suspension of the car body and lading which does not develop synchronous motion, and in this way has improved riding qualities.

It is to be understood that I do not wish to be limited by the exact embodiment of the device shown which is merely by way of illustration and not limitation, as various and other forms of the device will of course be apparent to those skilled in the art without departing from the spirit of the invention or the scope of the claims.

What is claimed is—

1. In a car truck, the combination of a side frame including tension and compression members and integral connecting column guides forming a window, a bolster extending into said window, an equalizer member supporting said bolster at a plurality of points and resiliently supported on said side frame between said points.

2. In a car truck, the combination of a side frame including tension and compression members and integral connecting column guides forming a window, a bolster extending into said window, an equalizer member supporting said bolster resiliently and non-resiliently respectively at spaced points, and resiliently supported on said side frame between said points.

3. In a car truck, the combination of a side frame including tension and compression members and integral connecting column guides forming a window, a bolster extending into said window, an equalizer member supporting said bolster and supported on said tension member in said window, the points of support of said equalizer and bolster being inwardly and outwardly of said side frame.

4. In a car truck, the combination of a side frame including tension and compression members and integral connecting column guides forming a window, a bolster extending into said window, an equalizer member supporting said bolster through a coil spring at one end and through a non-resilient connection at another, and a coil spring directly supporting said equalizer on said side frame.

5. In a car truck, the combination of a side frame including tension and compression members and integral connecting column guides forming a window, a bolster extending into said window, an equalizer member supporting said bolster through a coil spring at one end and through a non-resilient connection at another, and a coil spring directly supporting said equalizer on said side frame between said first named coil spring and said non-resilient connection.

6. In a car truck, the combination of a side frame, a bolster, and an equalizer member supporting said bolster at a plurality of points and resiliently supported directly on said side frame between said points.

7. In a car truck, the combination of a side frame, a bolster, and an equalizer member supporting said bolster at a plurality of points, one of said points being non-resilient, said equalizer being resiliently supported directly on said side frame between said points.

8. In a car truck, the combination of a side frame, a bolster, and an equalizer member supporting said bolster at a plurality of points, one of said points being resilient, said equalizer being resiliently supported directly on said side frame between said points.

9. In a car truck, the combination of a side frame, a bolster, and an equalizer member supporting said bolster at a plurality of points, one of said points being resilient and another of said points being non-resilient, said equalizer being resiliently supported directly on said side frame between said points.

10. In a car truck, the combination of a side frame, a bolster, and an equalizer member supporting said bolster at a plurality of points and resiliently supported on said side frame, one of said points being outwardly of said side frame and being resilient through a coil spring mounted between said equalizer and bolster.

11. In a car truck, the combination of a side frame, a bolster, and an equalizer member supporting said bolster at a plurality of points and resiliently supported on said side frame, one of said points being outwardly of said side frame and being resilient through a coil spring mounted between said equalizer and bolster, the resilient means being of different character.

12. In a car truck, the combination of a side frame, a bolster, and an equalizer member supporting said bolster at a plurality of points, said equalizer member being resiliently supported on coil springs between said points and disposed on said side frame substantially in the plane of said side frame, said coil springs being of different character.

13. In a car truck, the combination of a side frame, a bolster, and an equalizer member supporting said bolster at a plurality of points, said equalizer member being resiliently supported on coil springs between said points and disposed on said side frame, said coil springs being of different character.

14. In a car truck, the combination of a side frame, a bolster, and an equalizer member supporting said bolster at a plurality of points, one of said points being upwardly through a coil spring, said equalizer member being resiliently supported on coil springs disposed on said side frame substantially in the plane of said side frame, said coil springs being of different character.

15. In a car truck, the combination of a side frame, a bolster, and an equalizer member supporting said bolster at a plurality of points, one of said points being upwardly through a coil spring, said equalizer member being resiliently supported on coil springs disposed on said side frame, said coil springs being of different character.

16. In a car truck, the combination of a side frame, a bolster, and an equalizer member supporting said bolster at a plurality of points, one of said points being through a coil spring disposed outwardly of said side frame, said equalizer member being resiliently supported on coil springs disposed on said side frame substantially in the plane of said side frame, said coil springs being of different character.

17. In a car truck, the combination of a side frame, a bolster, and an equalizer member supporting said bolster at a plurality of points, one of said points being through a coil spring disposed outwardly of said side frame, another of said points being non-resilient and disposed inwardly of said side frame, said equalizer member being resiliently supported on coil springs disposed on said side frame substantially in the plane of said side frame, said coil springs being of different character.

18. In a car truck, the combination of a side frame including tension and compression members and integral connecting column guides forming a window, a load carrying member extending into said window, an equalizer member supporting said load carrying member at a plurality of points and resiliently supported on said side frame, one of the points of support of said load carrying member and equalizer being outwardly of said side frame.

19. In a car truck, the combination of a side frame including tension and compression members and integral connecting column guides forming a window, a load carrying member extending into said window, an equalizer member supporting said load carrying member resiliently and non-resiliently respectively at spaced points and resiliently supported on said side frame, one of the points of support of said load carrying member and equalizer being outwardly of said side frame.

20. In a car truck, the combination of a side frame, a load carrying member, and an equalizer member supporting said load carrying member at a plurality of points and resiliently supported directly on said side frame, one of the points of support of said load carrying member and equalizer being outwardly of said side frame.

21. In a car truck, the combination of a side frame, a load carrying member, and an equalizer member supporting said load carrying member at a plurality of points, one of said points being non-resilient, said equalizer being resiliently supported directly on said side frame, one of the points of support of said load carrying member and equalizer being outwardly of said side frame.

22. In a car truck, the combination of a side frame, a load carrying member, and an equalizer member supporting said load carrying member at a plurality of points, one of said points being resilient, said equalizer being resiliently supported directly on said side frame, one of the points of support of said load carrying member and equalizer being outwardly of said side frame.

23. In a car truck, the combination of a side frame, a load carrying member, and an equalizer member supporting said load carrying member at a plurality of points, one of said points being resilient and another of said points being non-resilient, said equalizer being resiliently supported directly on said side frame, one of the points of support of said load carrying member and equalizer being outwardly of said side frame.

Signed at Chicago, Illinois, this 22nd day of September, 1931.

WILLIAM C. HEDGCOCK.